United States Patent
Tokunaga et al.

(10) Patent No.: US 7,311,593 B2
(45) Date of Patent: Dec. 25, 2007

(54) AIR PASSAGE SWITCHING DEVICE

(75) Inventors: Takahiro Tokunaga, Kosai (JP);
Tokuhisa Takeuchi, Chita-gun (JP);
Masahiro Ito, Takahama (JP); Koji Ito, Nagoya (JP)

(73) Assignee: DENSO Corporation, Kariya (JP)

( * ) Notice: Subject to any disclaimer, the term of this patent is extended or adjusted under 35 U.S.C. 154(b) by 89 days.

(21) Appl. No.: 11/159,608

(22) Filed: Jun. 23, 2005

(65) Prior Publication Data

US 2005/0287943 A1 Dec. 29, 2005

(30) Foreign Application Priority Data

Jun. 28, 2004 (JP) .............................. 2004-189408

(51) Int. Cl.
*F24F 7/007* (2006.01)
*B60H 1/00* (2006.01)
(52) U.S. Cl. ..................... 454/121; 454/69; 454/156; 165/43; 251/901
(58) Field of Classification Search ................ 454/121, 454/156, 159, 160, 69; 251/901, 249.5, 250; 160/310; 165/43
See application file for complete search history.

(56) References Cited

U.S. PATENT DOCUMENTS

| | | | |
|---|---|---|---|
| 1,138,994 A | 5/1915 | Steele | |
| 1,924,419 A | 8/1933 | Sinden | |
| 3,773,077 A | 11/1973 | Barnebey | |
| 4,084,617 A | 4/1978 | Happe | |
| 4,147,183 A | 4/1979 | Kalsi | |
| 4,484,728 A | 11/1984 | Moore | |
| 5,044,417 A * | 9/1991 | Bresson | 160/310 |
| 5,105,871 A * | 4/1992 | Baud et al. | 160/310 |
| 5,160,115 A | 11/1992 | Ito et al. | |
| 5,236,124 A | 8/1993 | Orbesen | |
| 5,238,023 A | 8/1993 | Kristoffer | |
| 5,243,830 A * | 9/1993 | Ito et al. | 62/344 |
| 5,706,170 A * | 1/1998 | Glovatsky et al. | 361/695 |
| 6,173,640 B1 | 1/2001 | Jacobsen et al. | |
| 6,508,703 B1 * | 1/2003 | Uemura et al. | 454/156 |
| 6,569,009 B2 * | 5/2003 | Nishikawa et al. | 454/121 |
| 6,843,301 B2 * | 1/2005 | Carrillo et al. | 160/310 |
| 2003/0232590 A1 * | 12/2003 | Okumura et al. | 454/121 |

FOREIGN PATENT DOCUMENTS

JP 05-238244 9/1993
JP 11082277 A * 3/1999

* cited by examiner

*Primary Examiner*—Steven B. McAllister
*Assistant Examiner*—Patrick F. O'Reilly, III
(74) *Attorney, Agent, or Firm*—Harness, Dickey & Pierce, PLC

(57) ABSTRACT

An air passage switching device includes a film member for opening and closing an opening portion of an air passage, and the film member has a first end portion fixed to a peripheral portion of the opening portion and a second end portion fixed to a winding shaft. The winding shaft is capable of moving in a first direction separated from the first end portion of the film member and in a second direction approaching the first end portion of the first member while rotating. In the air passage switching device, an actuator for operating the winding shaft is disposed in an interior of the winding shaft and is fixed by a fixing member, the winding shaft is disposed rotatably relative to the fixing member, and the fixing member is moved in the first direction or the second direction together with the winding shaft by a guide unit.

15 Claims, 5 Drawing Sheets

AIR PASSAGE SWITCHING DEVICE

CROSS REFERENCE TO RELATED APPLICATION

This application is based on Japanese Patent Application No. 2004-189408 filed on Jun. 28, 2004, the contents of which are incorporated herein by reference in its entirety.

FIELD OF THE INVENTION

The present invention relates to an air passage switching device for opening and closing an air passage using a film member of a film door. The air passage switching device may be suitably used for a vehicle air conditioner.

BACKGROUND OF THE INVENTION

In an air passage switching device described in JP-A-5-238244, two ends of a film member having openings are respectively connected to shafts and are wound on or rewound from the shafts, so that the film member is moved in an air conditioning case. Therefore, the openings of the film member are moved relative to an air passage of the air conditioning case, and an opening portion of the air passage of the air conditioning case is opened and closed.

In this case, because the film member is moved while sliding on the opening portion of the air passage of the air conditioning case, a friction force is caused between the film member and the air conditioning case. Furthermore, because the film member is pressed on the opening portion of the air passage by an air pressure of blown air, the friction force is further increased due to the sliding of the film member.

To overcome the above-described problem, U.S. Pat. application publication No. 2003-0232590 proposes an air passage switching device for preventing a sliding friction of a film member on an opening portion of an air passage of a casing. In this air passage switching device, one end portion of the film member is fixed to a periphery of the opening portion of the air passage, and the other end portion of the film member is fixed to a winding shaft. The winding shaft is moved while rotating, in a direction close to the one end portion of the film member or far away from the one end portion of the film member. Therefore, the other end portion of the film member is wound or rewound around the winding shaft in accordance with the rotation and movement of the winding shaft. Accordingly, a film length from the one end portion of the film member is changed and the opening portion of the air passage is opened and closed by the film member. In this case, the slidable friction is not caused. However, a drive actuator for rotating and moving the winding shaft and a rotation mechanism are mounted outside the winding shaft, and it is difficult to reduce the size of the air passage switching device.

SUMMARY OF THE INVENTION

In view of the above-described problems, it is an object of the present invention to reduce the size of an air passage switching device, which includes a film member having a fixed first end portion and a second end portion wound on or rewound from a winding shaft.

It is another object of the present invention to provide an air passage switching device having a simple electrical connection structure, which includes a film member having a fixed first end portion and a second end portion wound on or rewound from a winding shaft.

According to an embodiment of the present invention, an air passage switching device includes a casing for defining an air passage having an opening portion, and a film member for opening and closing the opening portion. The film member has a first end portion fixed to a peripheral portion of the opening portion of the casing and a second end portion opposite to the first end portion. Furthermore, a winding shaft, to which the second end portion of the film member is fixed, is capable of moving in a first direction separated from the first end portion of the film member and in a second direction approaching the first end portion of the first member while rotating, and the second end portion is wound on or rewound from the winding shaft such that a length of the film member from the first end portion is changed when the winding shaft is moved while rotating. In the air passage switching device, an actuator for operating the winding shaft is disposed in an interior of the winding shaft, a fixing member fixes the actuator, a guide unit guides the fixing member to be moved in the first direction or the second direction together with the winding shaft, and the winding shaft is disposed rotatably relative to the fixing member.

Because the actuator for rotating the winding shaft is accommodated within a hollow-shaped interior of the winding shaft, it is unnecessary to provide an arrangement space of the actuator outside the winding shaft, and the size of the air passage switching device can be effectively reduced.

For example, the fixing member has a shaft portion to which the winding shaft is rotatably fitted. Specifically, two shaft portions are provided at two axial end portions of the fixing portion, and the winding shaft has two axial end portions which are rotatably engaged with the two axial end portions of the fixing portion, respectively.

The guide unit can be constructed with a fixed guide which is provided outside the winding shaft, and a movable guide which is provided in the fixing member to be movable together with the fixing member and is engaged with the fixed guide.

A deceleration unit can be disposed in the interior of the winding shaft for reducing a rotation of the actuator, while the deceleration unit transmits the rotation of the actuator to the winding shaft. As an example, the deceleration unit includes a male screw member rotatable by the rotation of the actuator, a female screw member which is meshed with the male screw member and is restricted in rotation by the fixing portion, and a screw recess on an inner peripheral surface of the winding shaft. In this case, the female screw member has a pin which is slidably fitted in the screw recess. Therefore, a large deceleration ratio can be easily obtained, and the size of the actuator can be reduced.

Electrical power can be supplied to the actuator through an electrical conductor. In this case, the electrical conductor may include a first conductive member provided in the film member, and a second conductive member provided within the winding shaft. As an example, the first conductive member extends from the second end portion to the first end portion within the film member.

Alternatively, the electrical conductor may be connected to the actuator through an interior of the fixing member, and extends from an interior of the winding shaft to an exterior of the winding shaft. In this case, electrical connection structure of the motor can be made simple.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS

First Embodiment

Figure 1:
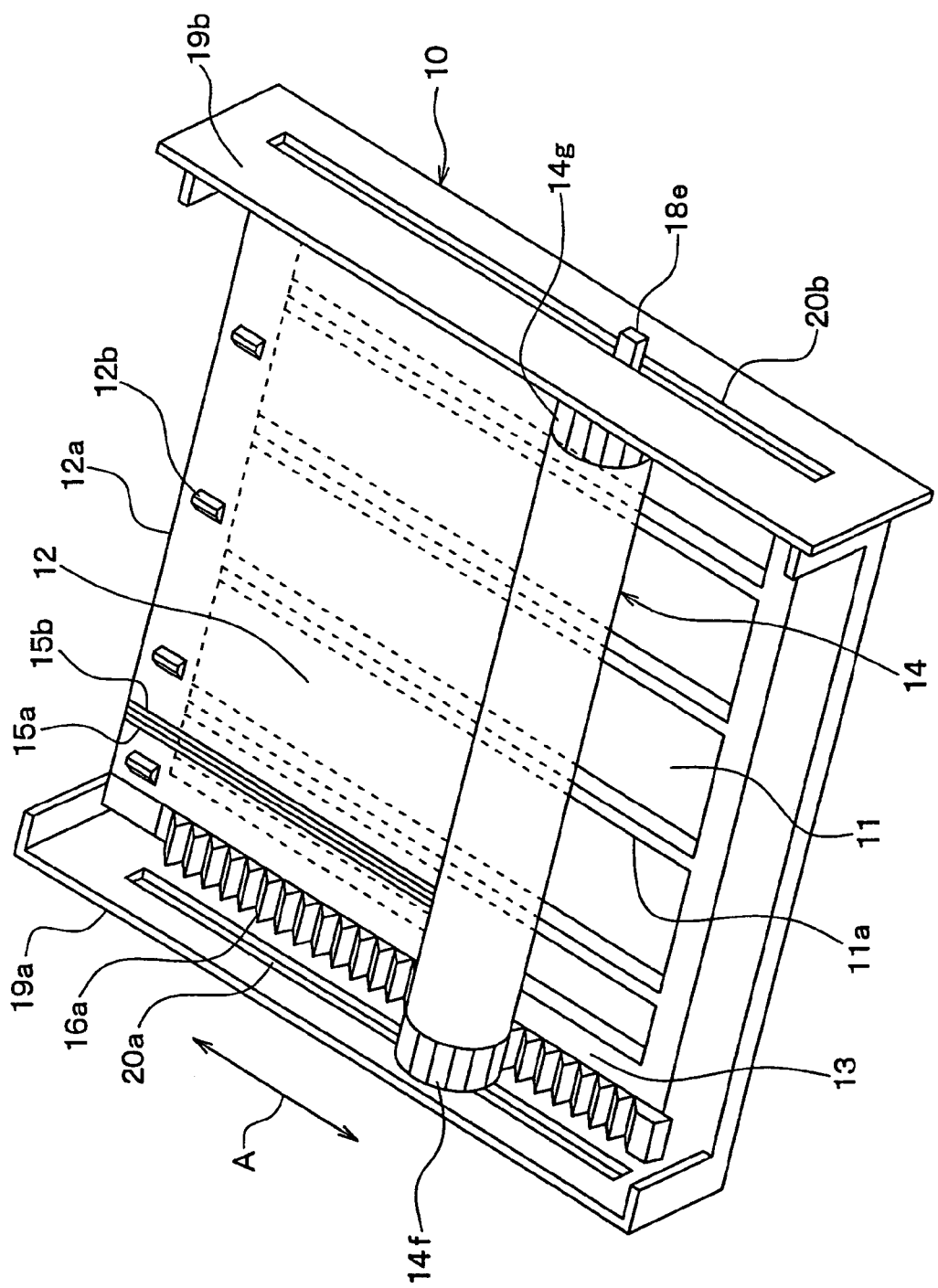
FIG. 1 is a perspective view of an air passage switching device according to a first preferred embodiment of the present invention.
Figure 2:
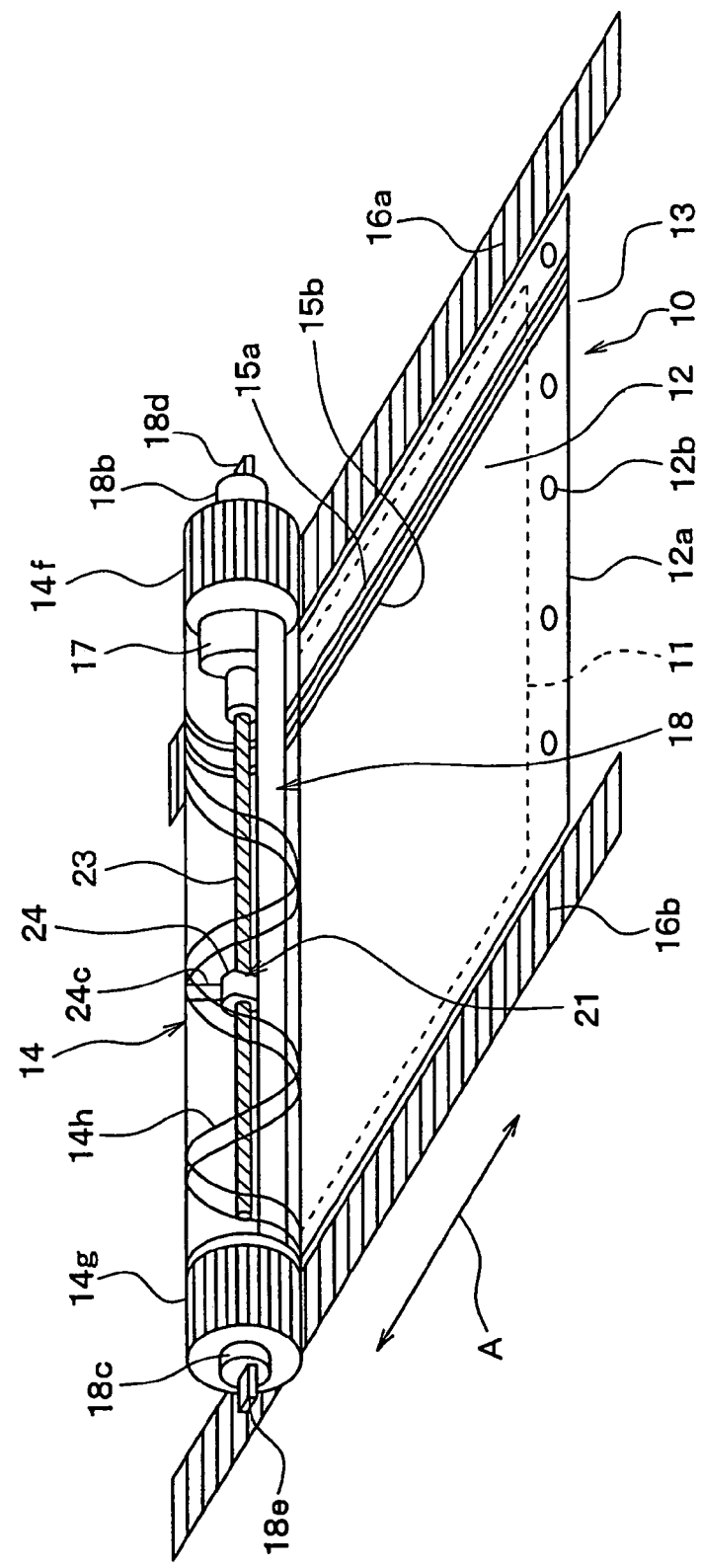
FIG. 2 is a schematic perspective view showing a winding or unwinding state of the winding shaft according to the first embodiment.

In this embodiment, an air passage switching device for opening and closing an opening portion of an air passage is typically used for a vehicle air conditioner, for example.

An air conditioning casing 10 of the air conditioner is made of resin and forms an air passage through which air flows into a compartment, e.g., a passenger compartment of the vehicle. A rectangular opening portion 11 through which air flows is formed in the air passage of the air conditioning casing 10.

A film member 12 is arranged on an upstream air side (e.g., upper side in FIG. 1) of a periphery of the opening portion 11. In this embodiment, a seal surface 13 is provided on the upstream portion of the opening portion 11 in the air conditioning casing 10, and the film member 12 is arranged to contact the seal surface 13.

As an example, the opening portion 11 is an opening portion of a cool air passage or/and a warm air passage within the air conditioning casing 10. Cool air cooled by a cooling heat exchanger flows in the cool air passage in the air conditioning casing 10, and warm air heated by a heating heat exchanger flows in the warm air passage in the air conditioning casing 10. Generally, the cool air passage and the warm air passage are arranged adjacently in the air conditioning casing 10.

For example, the cooling heat exchanger is constructed with a refrigerant evaporator of a refrigerant cycle, and the heating heat exchanger is constructed with a hot-water heater core which heats air using hot water (engine-cooling water) of a vehicle engine as a heat source.

An open degree (open area) of the cool air passage and an open degree (open area) of the warm air passage can be adjusted by air passage switching devices, respectively. In this case, a structure of an air passage switching device for opening and closing the cool air passage may be made similar to a structure of an air passage switching device for opening and closing the warm air passage. By adjusting a flow ratio between an amount of cool air flowing in the cool air passage and an amount of warm air flowing in the warm air passage, the temperature of air blown to a compartment, e.g., a passenger compartment can be adjusted.

A film door includes a film member 12 having a suitable flexibility, for opening and closing opening portion 11. The film member 12 has a rectangular shape, and an area of the film member 12 is larger than an open area of the opening portion 11. A first end portion 12a of the film member 12 is fixed to the seal surface 13 of the opening portion 11 by using fixing portions 12b.

For example, as the fixing portions 12b, L-shaped engagement claw pieces can be formed integrally with the periphery portion (casing 10) of the opening portion 11. In this case, the L-shaped engagement claw pieces are inserted and engaged with engagement holes provided in the first end portion of the film member 12, so that the first end portion 12a of the film member 12 is fixed to the seal surface 13.

A second end portion of the film member 12, opposite to the first end portion 12a, is fixed to an outer peripheral surface of the winding shaft 14. Specifically, a flat surface (not shown) is formed on a part of the outer peripheral surface of the winding shaft 14, the second end portion of the film member 12 is pressed to the flat surface, and a holding member is located on the second end portion of the film member 12. Furthermore, the holding member is fixed to the outer peripheral surface of the winding shaft 14 by using screws, so that the second end portion of the film member 12 is fixed to the outer peripheral surface of the winding shaft 14. Here, by forming the holding member in a circular arc shape in cross section, the sectional shape of an entire portion of the winding shaft 14 including the holding member can be formed into a substantial round shape.

The winding shaft 14 is reciprocated in the moving direction A in FIG. 1 on the opening portion 11 while rotating, by a mechanism described later, such that the second end portion of the film member 12 is wound on or rewound from the winding shaft 14. Here, the moving direction A is a direction separating from or close to the first end portion 12a of the film member 12. Therefore, a length of the film member 12 from the first end portion 12a on the opening portion 11 is changed in accordance with the movement of the winding shaft 14 in the direction A, and an open area of the opening portion 11 can be adjusted.

As a material of the film member 12, a film material having flexibility, such as a resin film material can be used. For example, polyethylene terephthalate (PET) film or polyphenylene sulfide (PPS) film can be suitably used as the material of the film member 12. Alternatively, a film material can be bonded on a cloth material so as to increase the strength of the film member 12.

In this embodiment, two film materials are used as the film member 12. Two electrical conductive members 15a, 15b are inserted between the two film materials, and the two film materials are bonded to each other, so as to form the film member 12. One of the two conductive members 15a, 15b is the positive electrode, and the other one of the two conductive member 15a, 15b is the negative electrode.

The conductive members 15a, 15b are thin and long members and arranged to extend to the whole length of the film member 12 in the moving direction A of the winding shaft 14. The conductive members 15a, 15b are constructed with thin plate members made of a material having an electrical conductivity and a flexibility, for example, copper. Therefore, the conductive members 15a, 15b can be wound on or rewound from the winding shaft 14, together with the film member 12.

As shown in FIG. 1, plural grid members 11a extending in the moving direction A of the film member 12 are arranged in parallel with the moving direction. The grid members 11a can be formed integrally with the air conditioning case 10. The grid members 11a are located downstream of the film member 12 in the air flow direction to support the film member 12 from a downstream air side of the film member 12. Therefore, the film member 12 prevents from being expanded to a downstream air side due to an air pressure.

Figure 3:
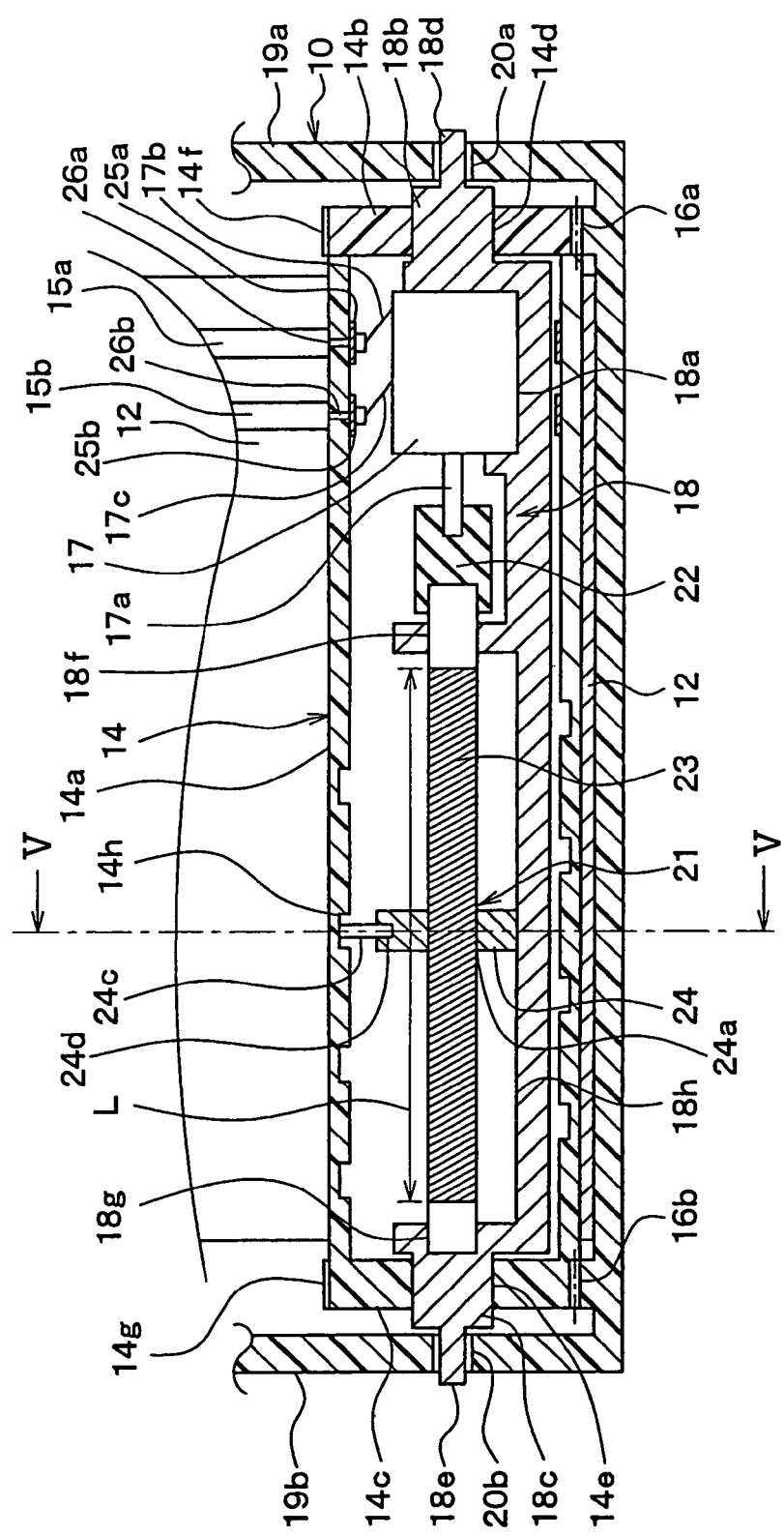
FIG. 3 is a sectional view in an axial direction of the winding shaft according to the first embodiment.

The winding shaft 14 has a hollow shape, as shown in FIG. 3. The winding shaft 14 includes a cylindrical body portion 14a for winding or rewinding the film member 12, an end plate 14b attached integrally to one axial end of the cylindrical body portion 14a, and an end plate 14c molded integrally with the other axial end of the cylindrical body portion 14a.

The cylindrical body portion 14a, the end plate 14b and the end plate 14c can be made of resin. The end plate 14b is fixed to an inner peripheral surface of the cylindrical body portion 14a through a claw engagement, for example. A circular fitting hole 14d is formed in a center portion of the end plate 14b, and a circular fitting hole 14e is formed in a center portion of the end plate 14c.

Circular gears (pinion gears) 14f, 14g are formed on the outer peripheral surfaces of the end plates 14b, 14c, respectively. The circular gears 14f, 14g are engaged with linear gears 16a, 16b (racks), respectively. The linear gears 16a, 16b are formed in the casing 10 outside the seal surface 13 to extend in straight lines along the moving direction A of the winding shaft 14.

By the engagements of the gears 14f, 14g of the winding shaft 14 with the linear gears 16a, 16b provided in the casing 10, the winding shaft 14 can be accurately moved in the moving direction A while rotating, and it can prevent the winding shaft 14 from sliding on the seal surface 13 of the opening portion 11.

A motor 17 and a motor fixing member 18 for fixing the motor 17 are disposed in the hollow-shaped interior of the winding shaft 14. The motor 17 is an actuator for rotating and moving the winding shaft 14. As the motor 17, a DC motor, a step motor, a blushless motor or a supersonic wave motor can be used, for example.

The motor 17 is arranged inside the winding shaft 14 such that the axial direction of the motor 17 corresponds to the axial direction of the winding shaft 14. As shown in FIG. 3, the motor 17 is disposed inside the winding shaft 14, adjacent to an axial end of the winding shaft 14. An output shaft 17a of the motor 17 is arranged at a side of the motor 17 within the winding shaft 14, to protrude toward the center portion of the winding shaft 14 in the axial direction. In this arrangement state, the motor 17 is fixed to the motor fixing member 18.

A circular arc support surface 18a is formed on a motor fixing member 18, and a lower part of a cylindrical outer surface of the motor 17 is fitted to the circular arc support surface 18a. After the lower part of the cylindrical outer surface of the motor 17 is fitted to the circular arc support surface 18a, a semicircular clamp member (not shown) is fitted to an upper part of the cylindrical outer peripheral surface of the motor 17. Then, end portions of the clamp member are fastened to an attachment surface of the motor fixing member 18 using fastening members. Accordingly, the motor 17 can be tightly fixed to the circular arc support surface 18a of the motor fixing member 18.

Cylindrical shaft portions 18b, 18c are formed integrally with two end portions of the motor fixing member 18 in the axial direction. The shaft portions 18b, 18c are rotatably fitted into the circular fitting holes 14d, 14e of the end plate 14b, 14c of the winding shaft 14. Therefore, the winding shaft 14 is rotatable with respect to the motor fixing member 18.

Figure 4:
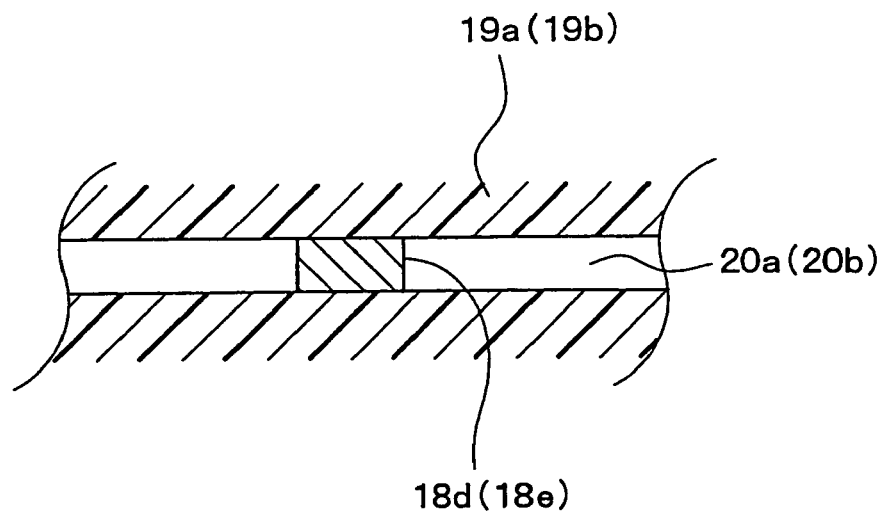
FIG. 4 is a sectional view showing an engagement state between a movable guide portion and an insertion groove of a casing, according to the first embodiment.

Movable guide portions 18d, 18e protrude from center portions of the shaft portions 18b, 18c of the motor fixing member 18 outside in the axial direction. The movable guide portions 18d, 18e have rectangular flat shapes in cross-section, as shown in FIG. 4.

The air conditioning casing 10 includes side walls 19a, 19b, which extend straightly along the moving direction A of the winding shaft 14 outside of the linear gears 16a, 16b in the axial direction. Insertion grooves 20a, 20b (fixed guide portions) for guiding the movable guide portions 18d, 18e in the moving direction A are formed in the side walls 19a, 19b of the air conditioning casing 10. The groove dimension (groove height) of the insertion grooves 20a, 20b is set such that the flat-plate shaped movable guide portions 18d, 18e are slidable in the insertion grooves 20a, 20b. As shown in FIG. 1, the insertion grooves 20a, 20b are formed to extend straightly in the moving direction A and are substantially parallel to the seal surface 13.

Because the movable guide portions 18d, 18e have the flat plate shapes and the insertion grooves 20a, 20b have non-round shapes, a rotation of the motor fixing member 18 including the movable guide portion 18d can be prevented. Therefore, the motor fixing member 18 is moved straightly in the moving direction A in accordance with the movement of the winding shaft 14 in the moving direction A.

Next, a deceleration mechanism arranged inside the winding shaft 14 will be described. A deceleration mechanism 21 is arranged inside the winding shaft 14 at an end position opposite to the motor 17 in the axial direction. The deceleration mechanism 21 includes a male screw member 23 coupled to the output shaft 17a of the motor 17 through a connection member 22, and a female screw member 24 meshed with the male screw member 23.

The male screw member 23 is constructed with a male screw formed on an outer peripheral surface of a shaft member made of metal or resin. The male screw member 23 is arranged parallel to the axial direction of the winding shaft 14. Two axial end portions of the male screw members 23 are rotatably supported in shaft holes 18f, 18g provided in the motor fixing member 18.

Figure 5:
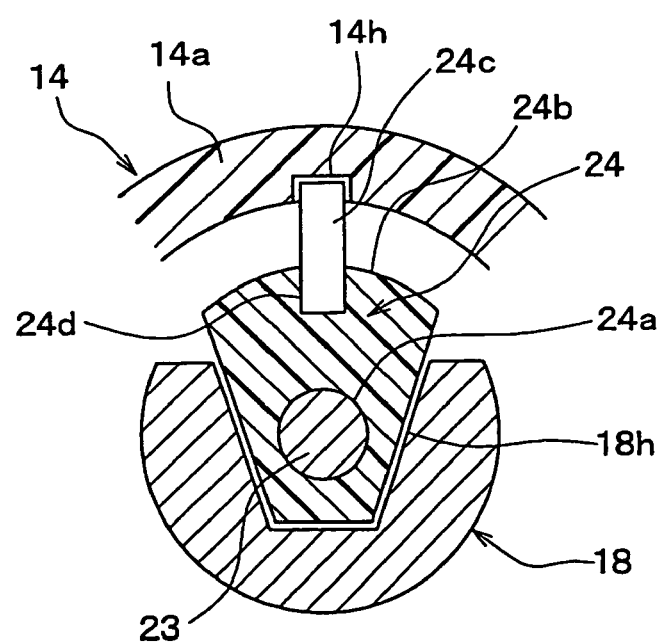
FIG. 5 is a cross-sectional view taken along line V-V in FIG. 3.

As shown in FIG. 5, the female screw member 24 has an approximate fan-shaped cross section. A through hole is formed in the female screw member 24 to penetrate through a plate member of the female screw member 24, and a female screw 24a is provided in the through hole. Thus, the female screw member 24 forms a nut. The female screw member 24 has a circular-arc shaped outer peripheral surface 24b formed along an inner peripheral surface of the winding shaft 14, and a pin 24c is fixed to the circular-arc shaped outer peripheral surface 24b.

In this embodiment, as an example, the female screw member 24 is made of resin, and the pin 24c made of metal (e.g., iron) is fitted into a hole 24d that is provided in the circular-arc shaped outer peripheral surface 24b of the female screw member 24.

A fitting recess portion 18h is formed in the motor fixing member 18 and has an opposite trapezoid shape. The fitting recess portion 18h has a bottom surface contacting a bottom surface of the female screw member 24, and side surfaces contacting side surfaces of the female screw member 24. The fitting recess portion 18h restricts a rotation of the female screw member 24 when the male screw member 23 rotates, so that the female screw member 24 is moved only in the axial direction of the male screw member 23. Accordingly, the fitting recess portion 18h is formed in an axial range equal to or larger than a male screw forming range L (see FIG. 3) of the male screw member 23.

A screw recess 14h is formed to be recessed from the inner peripheral surface of the cylindrical body portion 14a of the winding shaft 14 in the male screw forming range L of the male screw member 23. A width dimension of the screw recess 14h is made slightly larger than a width dimension of the pin 24c, as shown in FIG. 5. Therefore, the top end portion of the pin 24c of the female screw member 24 can be slidably fitted into the screw recess 14h.

In this embodiment, the motor fixing member 18 is made of metal for increasing its strength. However, the motor fixing member 18 may be made of resin or rubber only when the motor fixing member 18 has a sufficient strength. The connection member 22 can be made of an elastic material having a sufficient elasticity. In this case, the connection member 22 restricts the vibration of the motor 17 from transmitting to the male screw member 23.

Next, electrical connection between the electrical conductive members 15a, 15b of the film member 12 and the motor 17 will be now described. As shown in FIG. 3, a positive motor terminal member 17b and a negative motor terminal member 17c are provided in the motor 17 to extend to the inner peripheral surface of the cylindrical body portion 14a of the winding shaft 14. Positive and negative collector rings 25a, 25b are provided on the inner wall surface of the cylindrical body portion 14a of the winding shaft 14 at positions corresponding to the motor terminal members 17b, 17c.

The collector rings 25a, 25b are electrically connected to tip end portions of the electrical conductive members 15a, 15b of the film member 12 through conductor members 26a, 26b penetrating through the cylindrical body portion 14a in a radial direction. Because the tip end portions of the electrical conductive members 15a, 15b are arranged at the second end portion of the film member 12, the conductor members 26a, 26b of the cylindrical body portion 14a are arranged adjacent to the second end portion of the film member 12.

Accordingly, electrical power is supplied to the motor 17 via the electrical conductive members 15a, 15b of the film member 12, the conductor members 26a, 26b of the cylindrical body portion 14a, the connector rings 25a, 25b and the motor terminal members 17b, 17c, in this order. When the electrical power is supplied to the motor 17, the motor 17 is operated.

When the motor 17 is operated, rotation of the output shaft 17a of the motor 17 is transmitted to the male screw member 23 through the connection member 22, so that the output shaft 17a and the male screw member 23 are integrally rotated. The female screw 24a of the female screw member 24 is meshed with male screw of the male screw member 23. However, in this case, a rotation of the female screw member 24 is restricted by the engagement between the female screw member 24 and the fitting recess portion 18h of the motor fixing member 18. Accordingly, the female screw member 24 moves in the axial direction of the male screw member 23 without rotating.

The tip end portion of the pin 24c integrated with the female screw member 24 is slidably fitted into the screw recess 14h formed on the inner peripheral surface of the cylindrical body portion 14a of the winding shaft 14. When the pin 24c moves in a direction parallel to the axial direction together with the female screw member 24, a rotation force is applied to the winding shaft 14 due to the screw shape of the screw recess 14h.

At this time, because the gears 14f, 14g of the winding shaft 14 are engaged with the linear gears 16a, 16b, the winding shaft 14 accurately moves in the moving direction A while rotating, without causing a sliding.

In contrast, the movable guide portions 18d, 18e provided in the motor fixing member 18 have flat plate shapes and are inserted into the insertion grooves 20a, 20b of the side walls 19a, 19b of the air conditioning casing 10. Therefore, the motor 17 and the motor fixing member 18 move in the moving direction A in accordance with a movement of the winding shaft 14 in the moving direction A.

A rotation direction and a rotation amount of the motor 17 can be controlled by a control device (not shown). By controlling the rotation direction and the rotation amount of the motor 17, the winding shaft 14 can be moved to a set position in the moving direction A. Therefore, a length of the film member 12 from the first end portion 12a on the opening portion 11 is suitably changed, and the open degree (open area) of the opening portion 11 can be adjusted. Accordingly, an air amount passing through the opening portion 11 can be arbitrarily adjusted.

In the air passage switching device, the second end portion of the film member 12 is wound on or rewound from the winding shaft 14, while the first end portion 12a of the film member 12 is fixed to the seal surface 13 of the air conditioning casing 10. Therefore, a friction between the film member 12 and the seal surface 13 of the air conditioning casing 10 can be prevented.

In this embodiment, the winding shaft 14 is formed into a hollow cylindrical shape, and the motor 17 (actuator) for driving the winding shaft 14 is arranged inside the winding shaft 14. Therefore, it is unnecessary to arrange the motor 17 outside the winding shaft 14, and the size of the air passage switching device can be greatly reduced.

Because the deceleration mechanism 21 is constructed with the screw engagement between the female screw member 24 and the male screw member 23, a large deceleration ratio can be easily obtained. Therefore, a necessary output of the motor 17 can be reduced, and the size of the motor 17 can be reduced. Furthermore, because the deceleration ratio of the deceleration mechanism 21 is large, a rotation force for rotating the male screw member 23 using a force from the winding shaft 14 is also large. Therefore, the position of the winding shaft 14 and the position of the film member 12 can be accurately controlled by the control device.

Second Embodiment

Figure 6:
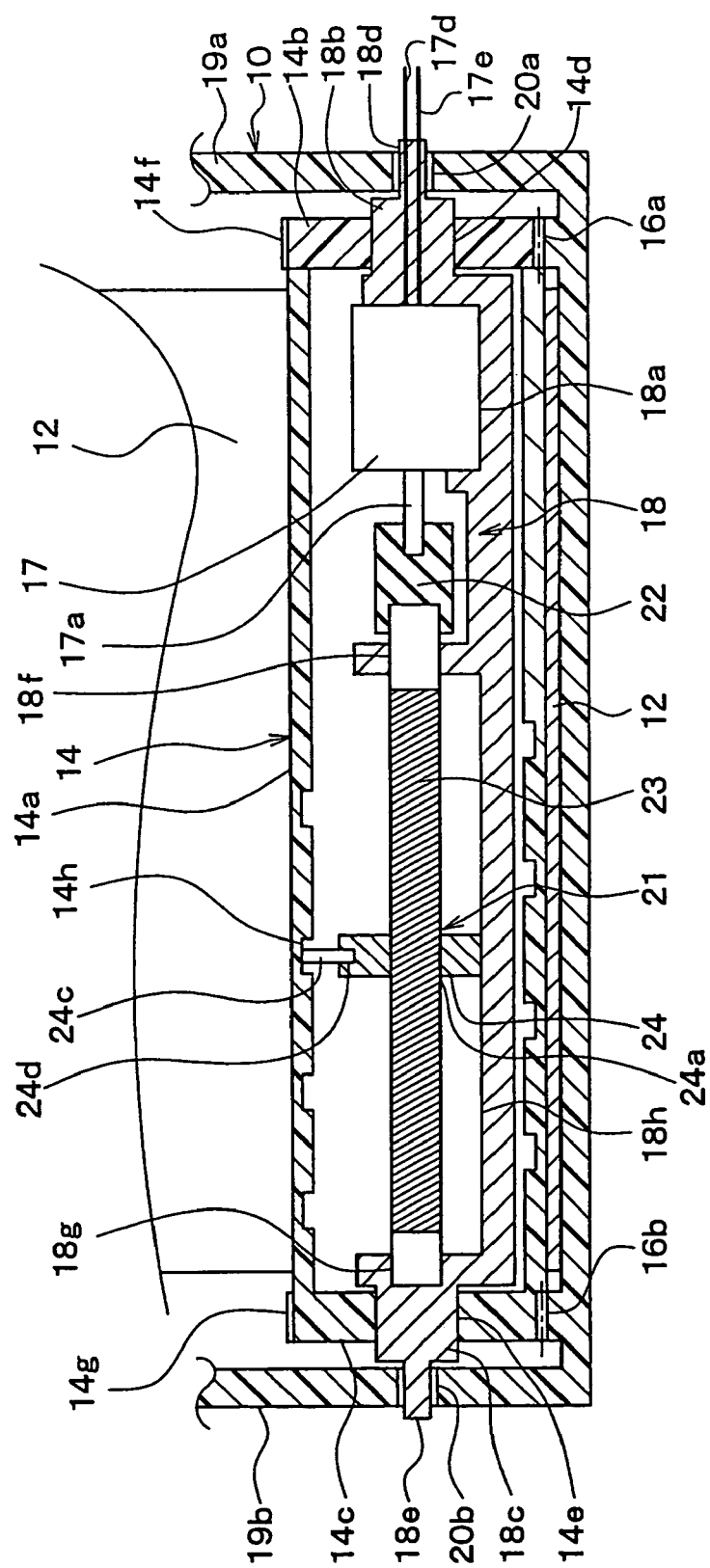
FIG. 6 is a sectional view in an axial direction of a winding shaft according to a second preferred embodiment of the present invention.

In the above-described first embodiment, electrical power is supplied to the motor 17 accommodated inside the winding shaft 14 through the electrical conductive members 15a, 15b of the film member 12, the conductor members 26a, 26b of the cylindrical body portion 14a, the collector rings 25a, 25b and the motor terminal members 17b, 17c. In the second embodiment, as shown in FIG. 6, positive and negative motor lead wires (terminal connectors) 17d, 17e electrically connected to the motor 17 are extended to an exterior of the side wall 19a of the air conditioning casing 10 through an interior of the shaft portion 18b and an interior of the movable guide portion 18d of the motor fixing portion 18. In this embodiment, it is unnecessary to provide the electrical conductive members 15a, 15b of the film member 12, the conductor member 26a, 26b of the winding shaft 14 and the collector rings 25a, 25b described in the first embodiment. Therefore, electrical connection structure to the motor 17 can be made simple.

The motor lead lines 17d, 17e move in the moving direction A together with the motor fixing member 18. Therefore, when tip end portions of the motor lead wires 17d, 17e are electrically connected to a fixed lead wire of the air conditioning casing 10, a lead wire length corresponding to the movement of the winding shaft 14 in the direction A may be provided either the motor leader wires 17d, 17e or the fixed lead wire.

Alternatively, a terminal portion of the motor lead wires 17d, 17e may be provided to slidably contact a fixed slidable conductor member of the air conditioning casing 10. In this case, the fixed slidable conductor member can be provided to extend linearly in the direction A along the slidable recess 20a.

OTHER EMBODIMENTS

Although the present invention has been described in connection with some preferred embodiments thereof with reference to the accompanying drawings, it is to be noted that various changes and modifications will become apparent to those skilled in the art.

For example, in the above-described embodiments, the movable guide portions 18d, 18e provided in the motor fixing member 18 are inserted into the insertion grooves 20a, 20b of the air conditioning casing 10, and the motor fixing member 18 is moved in the moving direction A of the winding shaft 14. However, rail-shaped protrusions extending in the moving direction A can be provided in the air conditioning casing 10, and recess portions into which the rail-shaped protrusions are fitted can be provided on the tip end portions of the shaft portions 18b, 18c of the motor mixing member 18, so that the motor fixing member 18 is moved in the moving direction A of the winding shaft 14.

In the above-described embodiments, the fitting recess portion 18h having an opposite trapezoid shape, which contacts right and left side surfaces and bottom surface of the female screw member 24, is formed in the motor fixing member 18, and a rotation of the female screw member 24 is restricted. However, the shapes of the female screw member 24 and the fitting recess portion 18h may be changed when the rotation of the female screw member 24 can be restricted. For example, a flat or non-flat contact surface may be provided between the motor fixing member 18 and the female screw member 24, to restrict a rotation of the female screw member 24.

Alternatively, a different member separated from the motor fixing member 18 may be provided to contact the female screw member 24, so as to restrict a rotation of the female screw member 24.

In the above-described first embodiment, the air passage switching device is used for opening and closing a cool air passage or a warm air passage in a vehicle air conditioner. However, the air passage switching device may be used for opening and closing an air outlet passage of a vehicle air conditioner. Furthermore, the air passage switching device may be suitably used for opening and closing an air passage, without being limited to a vehicle air conditioner.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are exemplary, other combinations and configuration, including more, less or only a single element, are also within the spirit and scope of the invention.

What is claimed is:

1. An air passage switching device comprising:
   a casing for defining an air passage having an opening portion;
   a film member for opening and closing the opening portion, the film member having a first end portion fixed to a peripheral portion of the opening portion and a second end portion opposite to the first end portion;
   a winding shaft to which the second end portion of the film member is fixed, wherein the winding shaft is capable of moving in a first direction separated from the first end portion of the film member and in a second direction approaching the first end portion of the film member while rotating, and the second end portion is wound on or unwound from the winding shaft such that a length of the film member from the first end portion is changed when the winding shaft is moved while rotating;
   an actuator for operating the winding shaft, the actuator disposed in an interior of the winding shaft;
   a fixing member which fixes the actuator;
   a guide unit which guides the fixing member to be moved in the first direction or the second direction together with the winding shaft,
   a deceleration unit disposed in the interior of the winding shaft for reducing a rotation of the actuator; and
   an output shaft connected to the actuator to be rotatable; wherein
   the deceleration unit transmits the rotation of the actuator to the winding shaft;
   the deceleration unit includes a male screw member coupled to the output shaft to be rotatable by the rotation of the output shaft, a female screw member threadingly engaging the male screw member, the female member being restricted from rotating by the fixing member and a screw recess extending in a screw shape in an axial direction of the winding shaft is formed on an inner peripheral surface of the winding shaft;
   the female screw member has a pin which is slidably fitted in the screw recess;
   the male screw member has a substantially cylindrical shape extending parallel to the axial direction of the winding shaft; and
   the winding shaft is disposed rotatably relative to the fixing member.

2. The air passage switching device according to claim 1, wherein the fixing member has a shaft portion to which the winding shaft is rotatably fitted.

3. The air passage switching device according to claim 1, wherein:
   two shaft portions are provided at two axial end portions of the fixing member; and
   the winding shaft has two axial end portions which are rotatably engaged with the two axial end portions of the fixing member, respectively.

4. The air passage switching device according to claim 1, wherein the guide unit is constructed with a fixed guide which is provided outside the winding shaft, and a movable guide which is provided in the fixing member to be movable together with the fixing member and is engaged with the fixed guide.

5. An air passage switching device comprising:
   a casing for defining an air passage having an opening portion;
   a film member for opening and closing the opening portion, the film member having a first end portion fixed to a peripheral portion of the opening portion and a second end portion opposite to the first end portion;

a winding shaft to which the second end portion of the film member is fixed, wherein the winding shaft is capable of moving in a first direction separated from the first end portion of the film member and in a second direction approaching the first end portion of the film member while rotating, and the second end portion is wound on or unwound from the winding shaft such that a length of the film member from the first end portion is changed when the winding shaft is moved while rotating;

an actuator for operating the winding shaft, the actuator disposed in an interior of the winding shaft;

a fixing member which fixes the actuator;

a guide unit which guides the fixing member to be moved in the first direction or the second direction together with the winding shaft, and an electrical conductor through which electrical power is supplied to the actuator, wherein the winding shaft is disposed rotatably relative to the fixing member; and the electrical conductor includes a first conductive member provided in the film member, and a second conductive member provided within the winding shaft.

6. The air passage switching device according to claim 5, wherein the first conductive member extends from the second end portion to the first end portion within the film member.

7. The air passage switching device according to claim 1, further comprising an electrical conductive member through which electrical power is supplied to the actuator, wherein the electrical conductive member is connected to the actuator while passing an interior of the fixing member, and extends from an interior of the winding shaft to an exterior of the winding shaft.

8. The air passage switching device according to claim 1, wherein:

the casing for defining the air passage is arranged in a vehicle so that air flows into a vehicle compartment through the air passage; and the film member controls a flow of air flowing in the air passage.

9. The air passage switching device according to claim 1, wherein the screw recess is provided opposite of the male screw in a radial direction.

10. An air passage switching device comprising:

a casing for defining an air passage having an opening portion;

a film member for opening and closing the opening portion, the film member having a first end portion fixed to a peripheral portion of the opening portion and a second end portion opposite to the first end portion;

a winding shaft to which the second end portion of the film member is fixed, wherein the winding shaft is capable of moving in a first direction separated from the first end portion of the film member and in a second direction approaching the first end portion of the film member while rotating, and the second end portion is wound on or unwound from the winding shaft such that a length of the film member from the first end portion is changed when the winding shaft is moved while rotating;

an actuator for operating the winding shaft, the actuator disposed in an interior of the winding shaft;

a fixing member which fixes the actuator;

a guide unit which guides the fixing member to be moved in the first direction or the second direction together with the winding shaft; and a deceleration unit, disposed in the interior of the winding shaft, for reducing a rotation of the actuator; wherein the deceleration unit transmits the rotation of the actuator to the winding shaft;

the winding shaft is disposed rotatably relative to the fixing member; and the guide unit prohibits rotation of the fixing member and the actuator.

11. The air passage switching device according to claim 10, wherein the fixing member has a shaft portion to which the winding shaft is rotatably fitted.

12. The air passage switching device according to claim 10, wherein:

two shaft portions are provided at two axial end portions of the fixing member; and the winding shaft has two axial end portions which are rotatably engaged with the two axial end portions of the fixing member, respectively.

13. The air passage switching device according to claim 10, wherein the guide unit is constructed with a fixed guide which is provided outside the winding shaft, and a movable guide which is provided in the fixing member to be movable together with the fixing member and is engaged with the fixed guide.

14. The air passage switching device according to claims 10, further comprising an electrical conductive member through which electrical power is supplied to the actuator, wherein the electrical conductive member is connected to the actuator while passing an interior of the fixing member, and extends from an interior of the winding shaft to an exterior of the winding shaft.

15. The air passage switching device according to claim 10, wherein:

the casing for defining the air passage is arranged in a vehicle so that air flows into a vehicle compartment through the air passage; and the film member controls a flow of air flowing in the air passage.

* * * * *